US012447261B2

(12) United States Patent
Govari et al.

(10) Patent No.: US 12,447,261 B2
(45) Date of Patent: Oct. 21, 2025

(54) MANAGING PHACOEMULSIFICATION USER DEFINED PROTOCOLS

(71) Applicant: JOHNSON & JOHNSON SURGICAL VISION, INC., Irvine, CA (US)

(72) Inventors: Assaf Govari, Haifa (IL); Christopher Thomas Beeckler, Brea, CA (US); Vadim Gliner, Haifa (IL); Ilya Sitnitsky, Nahariya (IL); Amit Fuchs, Hogla (IL); Joseph Thomas Keyes, Sierra Madre, CA (US); Eran Aharon, Haifa (IL)

(73) Assignee: Johnson & Johnson Surgical Vision, Inc., Irvine, CA (US)

( * ) Notice: Subject to any disclaimer, the term of this patent is extended or adjusted under 35 U.S.C. 154(b) by 568 days.

(21) Appl. No.: 17/740,685

(22) Filed: May 10, 2022

(65) Prior Publication Data
US 2023/0040764 A1 Feb. 9, 2023

Related U.S. Application Data

(60) Provisional application No. 63/230,741, filed on Aug. 7, 2021.

(51) Int. Cl.
*A61F 9/007* (2006.01)
*A61M 3/02* (2006.01)
(Continued)

(52) U.S. Cl.
CPC ........ *A61M 3/0275* (2013.01); *A61M 3/0202* (2021.05); *B06B 1/0284* (2013.01);
(Continued)

(58) Field of Classification Search
CPC .......... A61B 2017/00199; A61B 2017/00022; A61B 2017/00017; A61B 2017/00137;
(Continued)

(56) References Cited

U.S. PATENT DOCUMENTS

| 5,279,547 A | 1/1994 | Costin |
| 6,690,280 B2 | 2/2004 | Citrenbaum et al. |

(Continued)

FOREIGN PATENT DOCUMENTS

| DE | 3234621 A1 | 3/1984 |
| EP | 0956840 A2 | 11/1999 |

(Continued)

OTHER PUBLICATIONS

EBME—Introduction to Cold Phaco (Year: 2024).*
(Continued)

*Primary Examiner* — Vi X Nguyen

(57) ABSTRACT

An eye surgery system includes an Input/Output (I/O) device and a processor. The I/O device is configured to enable a user to define one or more eye surgery protocols, and further configured to, using the I/O device, present a graphical user interface (GUI) that displays one or more user defined eye surgery protocols. The processor is configured to (a) present the one or more user defined eye surgery protocols on the I/O device using the GUI, (b) test compatibility of the one or more user defined eye surgery protocols with the eye surgery system, and (c) provide an indication of the compatibility to a user of the eye surgery system.

21 Claims, 3 Drawing Sheets

(51) Int. Cl.
*B06B 1/02* (2006.01)
*B06B 1/06* (2006.01)
*G01R 27/02* (2006.01)
*G06F 3/04847* (2022.01)
*A61B 17/00* (2006.01)

(52) U.S. Cl.
CPC ............ *B06B 1/0614* (2013.01); *G01R 27/02* (2013.01); *G06F 3/04847* (2013.01); *A61B 2017/00199* (2013.01); *A61B 2217/005* (2013.01); *A61F 9/00745* (2013.01); *A61M 2205/3306* (2013.01); *A61M 2205/3393* (2013.01); *A61M 2205/581* (2013.01); *A61M 2205/587* (2013.01); *B06B 2201/76* (2013.01)

(58) Field of Classification Search
CPC ............ A61B 2090/3735; A61B 3/102; A61B 5/7425; A61B 5/748; A61B 17/3211; A61B 17/3213; A61B 2017/32113; A61F 9/00736; A61F 9/00745; A61F 9/00772; A61F 9/00781; A61F 9/008; A61F 2009/00846; A61F 2009/00857; A61F 2009/00859; A61F 2009/00872; A61F 2009/00874; A61F 2009/0088; A61F 2009/00882; A61F 2250/0095; A61F 9/007; A61F 9/00754; A61F 9/00806; A61F 9/009; A61M 2205/3306; A61M 3/0202; A61M 2210/0612; A61M 2025/0166; A61M 2205/0294; A61M 2205/3389; A61M 2205/505; B06B 1/00; B06B 3/00; B06B 1/0253; G01R 27/02; G06F 3/04847; G06K 17/00
See application file for complete search history.

(56) References Cited

U.S. PATENT DOCUMENTS

| | | | |
|---|---|---|---|
| 8,523,812 B2 | 9/2013 | Boukhny et al. | |
| 9,545,335 B2 | 1/2017 | Boukhny et al. | |
| 10,453,571 B2 | 10/2019 | Teodorescu | |
| 10,463,780 B2 | 11/2019 | Mallough et al. | |
| 10,596,033 B2 | 3/2020 | Urich et al. | |
| 2006/0079788 A1 | 4/2006 | Anderson et al. | |
| 2006/0129140 A1 | 6/2006 | Todd et al. | |
| 2007/0161972 A1 | 7/2007 | Felberg et al. | |
| 2009/0182266 A1 | 7/2009 | Gordon et al. | |
| 2010/0069825 A1 | 3/2010 | Raney | |
| 2011/0295191 A1* | 12/2011 | Injev ............... A61M 3/0216 604/65 |
| 2013/0211435 A1 | 8/2013 | Boukhny et al. | |
| 2014/0114296 A1* | 4/2014 | Woodley ............. A61F 9/00736 606/4 |
| 2015/0216726 A1 | 8/2015 | Kadziauskas et al. | |
| 2016/0175543 A1 | 6/2016 | Frankhouser et al. | |
| 2017/0102846 A1* | 4/2017 | Ebler ................. A61M 1/3623 |
| 2018/0028359 A1 | 2/2018 | Gordon et al. | |
| 2018/0318131 A1 | 11/2018 | Boukhny et al. | |
| 2019/0099526 A1* | 4/2019 | Hajishah ............. A61F 9/00745 |
| 2019/0133822 A1* | 5/2019 | Banko .................. A61M 1/774 |
| 2019/0247672 A1* | 8/2019 | Elghazzawi ......... A61N 1/3925 |
| 2021/0196515 A1 | 7/2021 | Urich | |
| 2022/0022852 A1* | 1/2022 | Durant ................ A61F 9/0079 |
| 2022/0104820 A1* | 4/2022 | Shelton, IV ...... A61B 17/07207 |
| 2023/0218438 A1* | 7/2023 | Nahum ............... A61F 9/00745 606/107 |

FOREIGN PATENT DOCUMENTS

| | | |
|---|---|---|
| EP | 1935383 A1 | 6/2008 |
| WO | 9211814 A1 | 7/1992 |
| WO | 2008016870 A2 | 2/2008 |
| WO | 2010014937 A1 | 2/2010 |
| WO | 2016122790 A1 | 8/2016 |
| WO | 2021119616 A1 | 6/2021 |

OTHER PUBLICATIONS

U.S. Appl. No. 17/357,587, titled, "Accurate Irrigation Rate Measurment System and Method," filed Jun. 24, 2021.
U.S. Appl. No. 16/727,100, titled "Phacoemulsification Apparatus," filed Dec. 26, 2019.

* cited by examiner

MANAGING PHACOEMULSIFICATION USER DEFINED PROTOCOLS

CROSS-REFERENCE TO RELATED APPLICATION

This application claims the benefit of U.S. Provisional Patent Application 63/230,741, filed Aug. 7, 2021, whose disclosure is incorporated herein by reference.

FIELD OF THE DISCLOSURE

The present disclosure relates generally to eye surgery systems, and particularly to user interfaces and algorithms to manage user defined phacoemulsification protocols.

BACKGROUND OF THE DISCLOSURE

A cataract is a clouding and hardening of the eye's natural lens, a structure which is positioned behind the cornea, iris and pupil. The lens is mostly made up of water and protein and as people age these proteins change and may begin to clump together obscuring portions of the lens. To correct this, a physician may recommend phacoemulsification cataract surgery. In the procedure, the surgeon makes a small incision in the sclera or cornea of the eye. Then a portion of the anterior surface of the lens capsule is removed to gain access to the cataract. The surgeon then uses a phacoemulsification probe, which has an ultrasonic handpiece with a needle. The tip of the needle vibrates at ultrasonic frequency to sculpt and emulsify the cataract while a pump aspirates particles and fluid from the eye through the tip. Aspirated fluids are replaced with irrigation of a balanced salt solution to maintain the anterior chamber of the eye. After removing the cataract with phacoemulsification, the softer outer lens cortex is removed with suction. An intraocular lens (IOL) is then introduced into the empty lens capsule restoring the patient's vision.

The present disclosure will be more fully understood from the following detailed description of the examples thereof, taken together with the drawings in which:

DETAILED DESCRIPTION OF EXAMPLES

Overview

Figure 1:
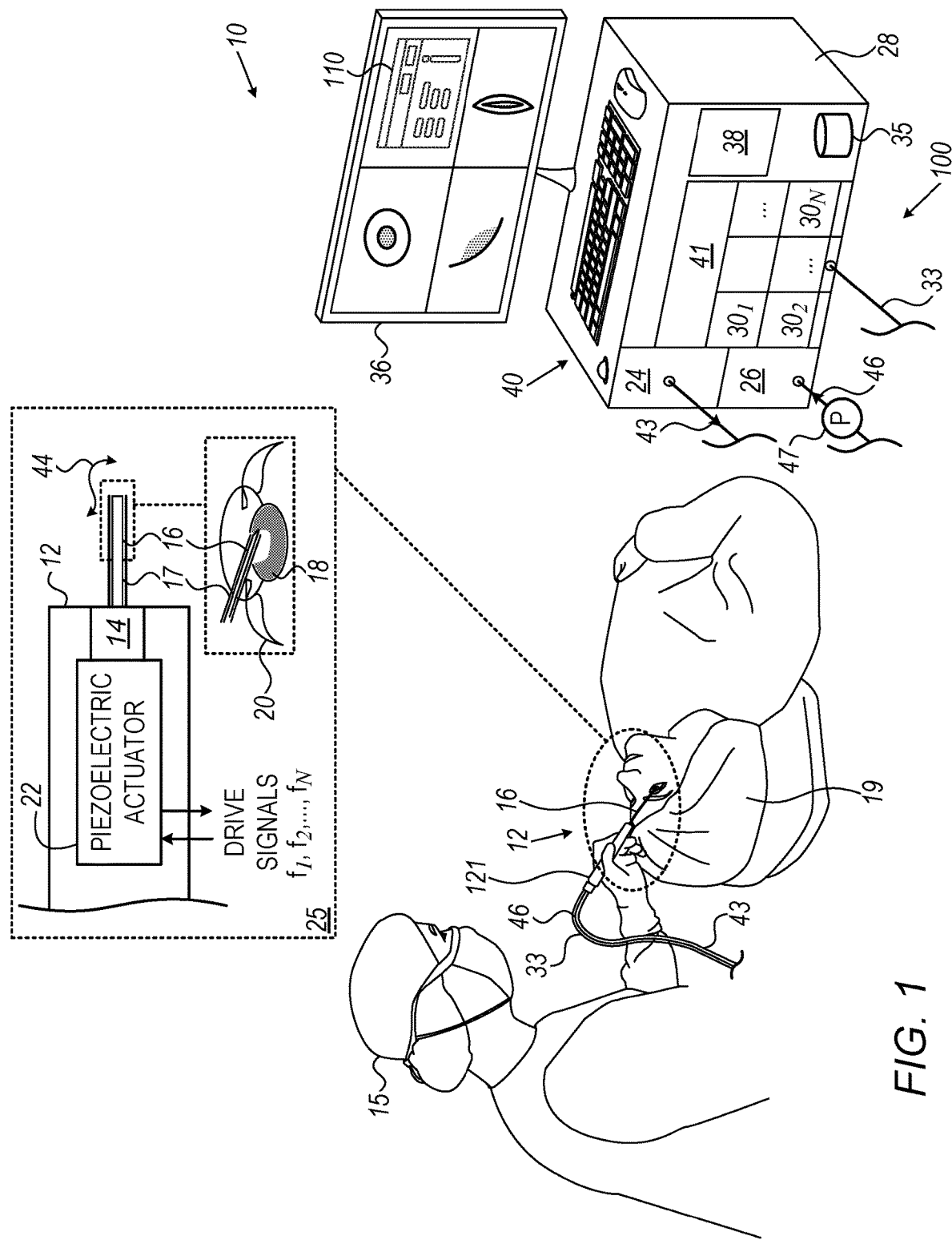
FIG. 1 is a pictorial view of a phacoemulsification system constructed to operate in accordance with an example of the present disclosure.

A phacoemulsification system typically includes a graphical user interface (GUI), presented on a suitable Input/Output (I/O) device such as on a touchscreen, to enable a user to define a phacoemulsification protocol and modify its parameters. It is customary for an eye surgeon, just before a procedure is conducted, to customize protocol parameters using, for example, multiple tabs of the GUI displayed on such a touchscreen. However, given that an eye surgery system may be used by many surgeons, such repeated customizations are time consuming and prone to errors.

As an example of protocol customization, a phacoemulsification I/O may define needle vibration, including a number of possible different trajectories, e.g., longitudinal, planar (e.g., elliptical, circular), torsional, as well as in combinations and sub-combinations of such trajectories. In addition, the user may desire to use sequences of such trajectories. Another example of customization includes vibration driving waveform and power, and, as other examples, aspiration rate and vacuum level.

Examples of the present disclosure that are described herein provide methods and apparatus that enable defining (e.g., generating) one or more eye surgery protocols on an eye surgery system and/or uploading one or more user defined eye surgery protocols to the eye surgery system, and compatibility testing of the defined (e.g., generated) and/or predefined protocols with the system, as well as testing compatibility among the parameters of each user protocol. The disclosed techniques retest such compatibilities subsequent to user modification of one or more parameters of a predefined protocol, e.g., after a protocol is uploaded to the system and/or GUI. The one or more user defined eye surgery protocols can be uploaded to an eye surgery system from a remote location.

In one example, the disclosed technique provides a method for a user to store, prior to a procedure, a protocol comprising possible needle trajectory sequences. The method checks if a set of sequences requested by the user is compatible with working parameters of the phacoemulsification device, and, in the event of incompatibility, provides an indication to the user how to correct the incompatibility. More generally, the disclosed solution provides means to test any protocol parameter, such as aspiration rate, vacuum level and driving waveform parameters (e.g., frequency and pulse width), among others.

The disclosed method and algorithms can be provided in a form of a computer software product comprising a tangible non-transitory computer-readable medium in which program instructions are stored, and, when read by a processor, cause the processor to (i) configure a graphical user interface (GUI) to display one or more user defined eye surgery protocols, (ii) upload the one or more user defined eye surgery protocols to the system and/or GUI, (iii) test compatibility of each protocol parameter among themselves and with the eye surgery system, and (iv) provide at least one of (a) an indication of the compatibility of the one or more protocols to a user of the eye surgery system, and (b) an indication of the incompatibility of two or more parameters of protocols, one with the other, if such are found.

By providing a method and algorithm to share predefined protocols among systems and to verify protocols automatically, an eye surgeon protocol preparation for an eye surgery (e.g., phacoemulsification) in a surgical theater environment may be made easier and more consistent.

System Description

FIG. 1 is a pictorial view of a phacoemulsification system 10 constructed to operate in accordance with an example of the present disclosure. FIG. 1 includes an inset 25, and, as shown in the figure and the inset system 10, it includes a phacoemulsification probe/handpiece 12 comprising a needle 16. Needle 16 is configured to be inserted into a lens capsule 18 of an eye 20 of a patient 19. Needle 16 is mounted on a horn 14 of probe 12, and is shown in inset 25 as a straight needle. However, any suitable needle may be used with the phacoemulsification probe 12, for example, a curved or bent tip needle commercially available from Johnson & Johnson Surgical Vision, Irvine, CA, USA. A physician 15 holds handpiece 12 by a handle 121 so as to perform a phacoemulsification procedure on the eye of patient 19. The physician may activate the handpiece using a foot pedal, which is not illustrated in FIG. 1.

Handpiece 12 comprises a piezoelectric actuator 22, which is configured to vibrate horn 14 and needle 16 in one or more resonant vibration modes of the combined horn and needle element. During the phacoemulsification procedure, the vibration of needle 16 is used to break a cataract into small pieces.

During the phacoemulsification procedure, an irrigation sub-system 24, which may be located in a console 28, pumps irrigation fluid from an irrigation reservoir to an irrigation sleeve 17 that surrounds needle 16, so as to irrigate the eye. The fluid is pumped via a tubing line 43 running from the console 28 to the probe 12. Irrigation sub-system 24 is described in more detail below.

An aspiration sub-system 26, also typically located in console 28, aspirates eye fluid and waste matter (e.g., emulsified parts of the cataract) from the patient's eye via needle 16 to a collection receptacle (not shown). Aspiration sub-system 26 comprises a pump which produces a vacuum that is connected from the sub-system to probe 12 by a vacuum tubing line 46. A gauge or sensor 47 in line 46 measures the aspiration vacuum pressure. Gauge 47 may be in any convenient location in line 46, including, but not limited to, a location in or in proximity to handpiece 12 or a location in or in proximity to the console.

Irrigation sub-system 24 and aspiration sub-system 26 are both under control of a processor 38. The processor controls the volume rate of flow at which the irrigation sub-system pumps fluid. The processor also controls the vacuum pressure produced by the aspiration sub-system, using a pressure reading from gauge 47.

Some or all of the functions of processor 38 may be combined in a single physical component or, alternatively, implemented using multiple physical components. The physical components may comprise hard-wired or programmable devices, or a combination of the two. In some examples, at least some of the functions of processor 38 may be carried out by suitable software stored in a memory 35. The software may be downloaded to a device in electronic form, over a network, for example. Alternatively, or additionally, the software may be stored in tangible, non-transitory computer-readable storage media, such as optical, magnetic, or electronic memory.

Processor 38 may receive user-based commands via a user interface 40, which may include setting and/or adjusting a vibration mode and/or a frequency of piezoelectric actuator 22, setting and/or adjusting a stroke amplitude of needle 16, and setting and/or adjusting an irrigation rate, an aspiration rate, and vacuum levels of irrigation sub-system 24 and aspiration sub-system 26. Additionally, or alternatively, processor 38 may receive user-based commands from controls located in handpiece 12, to, for example, select a trajectory 44, or another trajectory, for needle 16. The implementation of a trajectory such as trajectory 44 is described further below.

Processor 38 may present a user protocol 110 (the likes of described in detail in FIG. 2), and results of the phacoemulsification procedure on a display 36. User protocol 110 may be uploaded to the system from a remote location or be defined (e.g., generated) by the user locally, on the system, using an I/O device of the system. In an example, user interface 40 and display 36 may be one and the same, such as a touch screen graphical user interface (GUI). More generally, user interface 40 and display 36 are regarded as an example of an I/O device that presents the disclosed GUI. Processor 38 may present the disclosed graphical user interface (including both displaying GUI elements and receiving user input) using any other suitable I/O device.

The procedure illustrated in FIG. 1 may include further elements, which are omitted for clarity of presentation. For example, physician 15 typically performs the procedure using a stereo-microscope or magnifying glasses, neither of which are shown. Physician 15 may use other surgical tools, in addition to probe 12, which are also not shown to maintain clarity and simplicity.

Console 28 further comprises a multi-channel piezoelectric drive system 100 comprising drive-modules $30_1$, $30_2$, ... $30_N$, each coupled, using wiring in a cable 33, with a stack of piezoelectric crystals of actuator 22. Drive-modules $30_1$, $30_2$, ... $30_N$, generically termed drive-modules 30, are controlled by processor 38 and convey phase-controlled driving signals via cable 33 to piezoelectric actuator 22. In response, piezoelectric actuator 22 vibrates needle 16, which performs a vibrational/ultrasound trajectory 44, the trajectory typically comprising for example, one or a combination of the following: longitudinal, transverse, and/or torsional ultrasonic vibrations, which may be operated in synchronization one with the other. System 100 is described further below, with reference to FIGS. 2A and 2B.

Managing Phacoemulsification User Defined Protocols

Figure 2A:
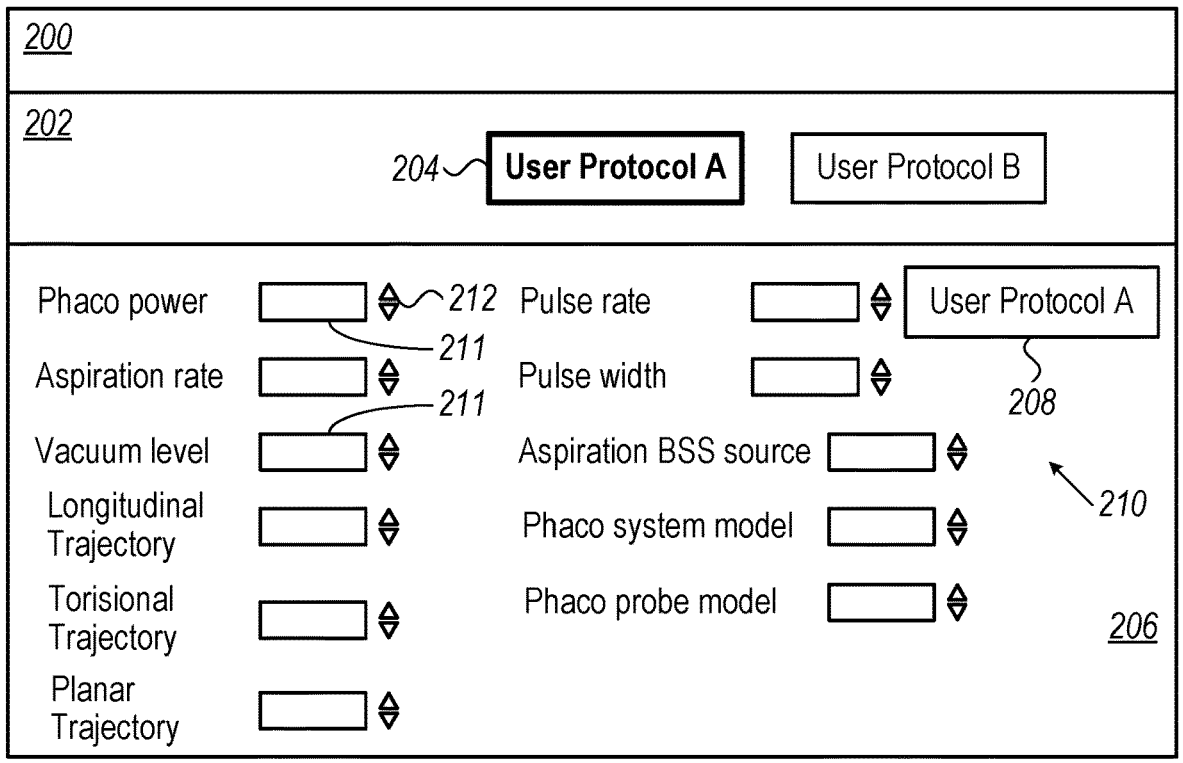
FIGS. 2A and 2B are schematic illustrations of a graphical user interface (GUI) of the system of FIG. 1, the GUI displaying two predefined user protocols, in accordance with an example of the present disclosure.
Figure 2B:
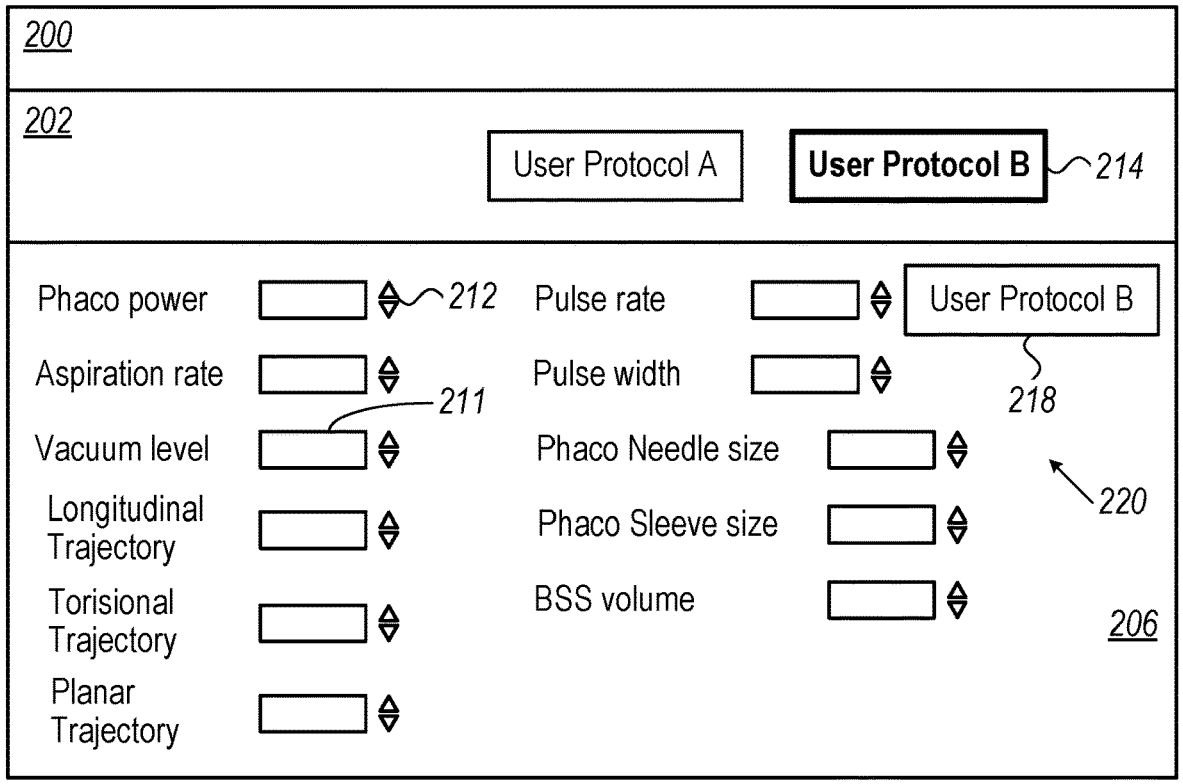

FIGS. 2A and 2B show two schematic illustrations of a graphical user interface (GUI) 200 of system 10 of FIG. 1, the GUI displaying two predefined user protocols (210, 220), in accordance with an example of the present disclosure.

As seen in the example, GUI 200 includes a region 202 that displays, using a highlighted tab (tab 204 in FIG. 2A and tab 214 in FIG. 2B), the active (e.g., editable) protocol. An active protocol (i.e., Protocol A or Protocol B) is further titled by respective tabs 208 and 218 in region 206 of the GUI that comprises parameter fields 211 (e.g., entries).

As seen, parameter fields 211 of both of the different protocols 210 and 220 can be modified using, for example, arrows 212 to change (e.g., increase or decrease) a parameter value. In an alternate example, the parameter fields may be entered using a keyboard (physical as seen FIG. 1 or virtual).

The user can define a protocol by, for exmaple, setting parameter values in predefined fields 211 using arrows 212 to increase or decrease any of the values. The user may further define a protocol by adding one or more fields taken from a predefined list of fields available in software for generating a protocol.

The shown GUI is configured to provide an indication of the protocol compatibility to a user of the eye surgery system by, for example, changing a color of the tab between green (for "compatible") to red (for "incompatible"), and further highlighting fields 211 (e.g., titles) of incompatible parameters.

In addition, the GUI highlights parameters that are incompatible with each other, providing an indication of the incompatibility to a user of the phacoemulsification system.

The example illustrations shown in FIGS. 2A and 2B are chosen purely for the sake of conceptual clarity. FIGS. 2A and 2B show only parts relevant to examples of the present disclosure.

Figure 3:
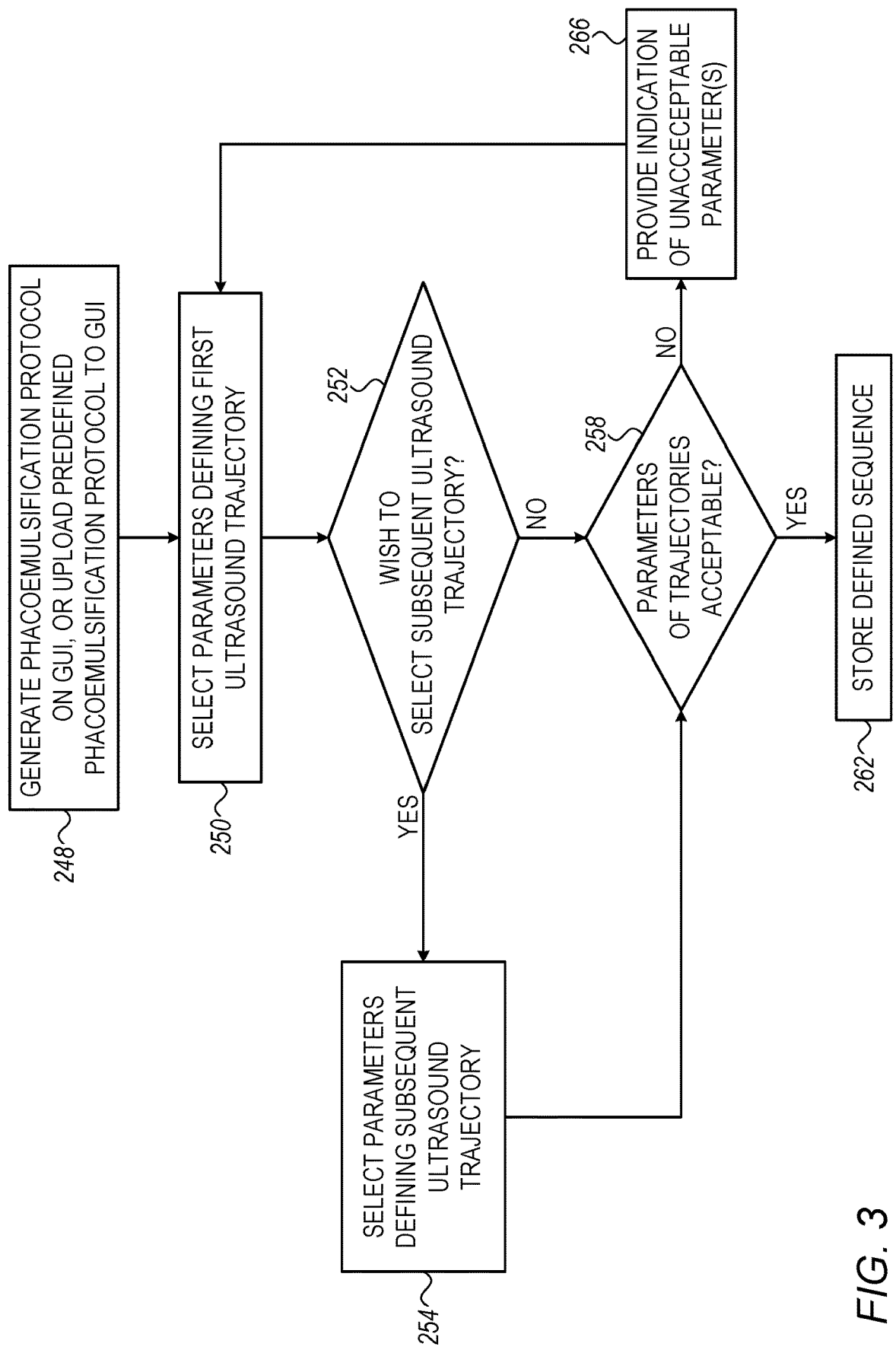
FIG. 3 is a flow chart describing steps providing a physician with a predefined phacoemulsification protocol on a GUI and means to modify the protocol and verify protocol compatibility, in accordance with examples of the present disclosure.

FIG. 3 is a flow chart describing steps providing a physician with a predefined phacoemulsification protocol on GUI 200 and means to modify the protocol and verify protocol compatibility, in accordance with examples of the present disclosure.

For example, during a phacoemulsification procedure, there are a large number of parameters that the physician performing the procedure may select, in order to control the ultrasonic trajectory of needle 16. In addition to controlling the trajectory, i.e., the path followed by a distal end of the needle, the physician also controls the power delivered (which typically affects the amplitude of the ultrasonic vibration) as well as the duration of the trajectory.

The flow chart of FIG. 3 describes steps that simplify the choice of parameters to be made by physician 15 in setting ultrasound trajectories for needle 16, in accordance with an example of the present invention. The flow chart assumes that the physician prepares, prior to a procedure, one or more trajectory sequences, each sequence comprising two or more individual trajectories. The physician typically uses a dedicated GUI tab for presenting, preparing, and/or modifying the sequences. During the procedure, the sequences are presented to the physician on display 36, and the physician may, for example, select a sequence from the display.

In an initial step 248 of the flow chart, the physician may program its own protocol using an I/O device, upload a predefined protocol (e.g., from a remote location) or select one or more predefined phacoemulsification protocols to/from GUI 200. Such protocols include, for example, parameters defining a trajectory of the vibrating needle 16 of phacoemulsification handpiece 12.

In a subsequent step 250 of the flow chart, the physician selects parameters defining a first ultrasound trajectory. The parameters typically include if the trajectory is to be longitudinal, planar (e.g., elliptical, or circular), or torsional, the power to be applied, and the duration of the trajectory. The trajectories may also comprise a combination of longitudinal, planar, or torsional trajectories, in which case the physician provides an amplitude for each of the different types or ratios of the powers for each of the different types, as well as an overall power for the combination.

Processor 38 translates the defined parameters into inputs to be provided by the processor to drive-modules 30.

Next, at a checking step 252, the processor checks if the physician wishes to select parameters defining a subsequent ultrasound trajectory. If the answer is no, the process goes directly to step 258.

If the answer is yes, in a subsequent step 254, the physician selects parameters defining a subsequent ultrasound trajectory, substantially as described for step 250. The physician may also select a transition period between the trajectories of steps 250 and 254. As for step 250, processor 38 translates the parameters into inputs for drive-modules 30.

If appropriate, the physician may iterate step 254 to define a further subsequent trajectory.

In a decision step 258 processor 38 evaluates if the parameters of the trajectories selected in steps 250 and 254 are acceptable, i.e., are within the capabilities of drive-modules 30, or are mutually compatible. The processor may evaluate the parameters selected in steps 250 and 254 against allowed parameter ranges stored in a look-up table, or using an algorithm, to determine if the selected parameters are indeed acceptable or not.

If step 258 returns positive ("Yes"), i.e., the sequence defined in steps 250 and 254 is acceptable, control continues to a final storage step 262, wherein the processor stores the defined sequence. The stored sequence may be presented to the physician on display 36 for selection during a phacoemulsification procedure.

If step 258 returns negative ("No"), i.e., the sequence defined in steps 250 and 254 is not acceptable, control continues to a notification step 266, wherein the processor provides the physician with an indication of what is unacceptable in the selected sequence. For example, while transitions between different sequences may typically be defined with a resolution of 20 μs, the physician may have requested a faster transition. In this case the processor may indicate to the physician that 20 μs is the minimum possible transition period.

From step 266 control returns to the beginning of the flow chart, so that the physician can change the definitions of selected sequences.

As stated above, physician 15 can use the flow chart to define acceptable sets of sequences. One sequence, according to an example of the present invention, comprises a first trajectory that is a longitudinal vibration, with a subsequent trajectory that is an elliptical vibration. Operating with a longitudinal mode is efficient in cutting lens material, but it may produce propagation waves that may damage other tissue. Use of a subsequent elliptical vibration may reduce formation of propagation waves.

The example flow chart shown in FIG. 3 is chosen purely for the sake of conceptual clarity. For example, other aforementioned parameters are tested and can be modified on GUI 200, such as irrigation, aspiration, vacuum, and waveform parameters, which are not considered here for simplicity and clarity of presentation.

EXAMPLES

Example 1

An eye surgery system (10) includes an Input/Output (I/O) device (40) and a processor (38). The I/O device is configured to enable a user (15) to define one or more eye surgery protocols, and further configured to, using the I/O device, present a graphical user interface (GUI) (200) that displays one or more user defined eye surgery protocols. The processor is configured to (a) present the one or more user defined eye surgery protocols on the I/O device using the GUI, (b) test compatibility of the one or more user defined eye surgery protocols with the eye surgery system, and (c) provide an indication of the compatibility to a user of the eye surgery system.

Example 2

The system according to example 1, wherein the processor (38) is configured to present the one or more user defined protocols by uploading the one or more user defined eye surgery protocols to the GUI (200).

Example 3

The system according to any of examples 1 and 2, wherein the one or more user defined eye surgery protocols are uploaded from a remote location.

Example 4

The system according to any of examples 1 through 3, wherein the processor (38) is further configured to indicate to the user an incompatibility between parameters of a user defined eye surgery protocol.

Example 5

The system according to any of examples 1 through 4, wherein the processor (38) is further configured to enable the user to modify a parameter of the one or more user defined eye surgery protocols using the GUI (200), to test the compatibility of the modified parameter with the eye surgery system, and to provide an indication of the compatibility to the user.

Example 6

The system according to any of examples 1 through 5, wherein the processor (38) is configured to provide the indication of the compatibility by highlighting one or more fields (211) of the GUI (200).

Example 7

The system according to any of examples 1 through 6, wherein the eye surgery system comprises a phacoemulsification system and the protocols comprise one or more phacoemulsification protocols.

Example 8

The system according to any of examples 1 through 7, wherein the phacoemulsification system (10) comprises (i) a phacoemulsification handpiece (12) comprising one or more piezoelectric crystals configured to vibrate a needle coupled with the one or more piezoelectric crystals, and (ii) one or more drive-modules (30) configured to vibrate the one or more piezoelectric crystals in a plurality of trajectories (44), in response to respective inputs to the drive-modules, wherein the processor (38) is configured to (a) select first parameters configured to vibrate the needle in a first trajectory, (b) select second parameters configured to vibrate the needle in a second trajectory, (c) determine that the inputs required for the drive-modules, in response to the first and second parameters, are incompatible with each other, and (d) provide an indication of the incompatibility to the user.

Example 9

The system according to any of examples 1 through 7, wherein the one or more phacoemulsification protocols specify parameters comprising one or more of: aspiration rate, vacuum level, phacoemulsification power and driving waveform parameters.

Example 10

The system according to any of examples 1 through 7, wherein the processor is configured to provide the indication of the incompatibility by highlighting one or more fields (211) of the GUI (200).

Example 11

An eye surgery method includes defining one or more eye surgery protocols using an Input/Output (I/O) device (40), and, using the I/O device, presenting a graphical user interface (GUI) (200) that is configured to display the one or more user defined eye surgery protocols. The one or more user defined eye surgery protocols are presented on the I/O device (40) using the GUI (200). Compatibility is tested of the one or more user defined eye surgery protocols with the eye surgery system. An indication of the compatibility is presented to a user of the eye surgery system.

Example 12

A computer software product, the product comprising a tangible non-transitory computer-readable medium in which program instructions are stored, which instructions, when read by a processor (38), cause the processor to (a) enable a user to define one or more eye surgery protocols using an Input/Output (I/O) device (40), and, using the I/O device, to present a graphical user interface (GUI) (200) that displays one or more user defined eye surgery protocols, (b) present the one or more user defined eye surgery protocols on the I/O device using the GUI (200), (c) test compatibility of the one or more user defined eye surgery protocols with the eye surgery system (10), and (e) provide an indication of the compatibility to a user of the eye surgery system.

Although the examples described herein mainly address phacoemulsification, the methods and systems described herein can also be used in other eye surgical applications that can benefit of user predefined protocols, such as Vitrectomy.

It will thus be appreciated that the examples described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An eye surgery system, comprising:
an Input/Output (I/O) device, configured to enable a user to define on a graphical user interface (GUI) one or more eye surgery protocols, and further configured to, using the I/O device, present one or more user defined eye surgery protocols on a display of the GUI; and
a processor, which is configured to:
present the one or more user defined eye surgery protocols on the I/O device using the GUI;
test compatibility of the one or more user defined eye surgery protocols with the eye surgery system prior to operation of the eye surgery system in a surgical procedure; and
provide an indication of the compatibility to a user of the eye surgery system on the GUI prior to operation of the eye surgery system in the surgical procedure.

2. The system according to claim 1, wherein the processor is configured to present the one or more user defined protocols by uploading the one or more user defined eye surgery protocols to the GUI.

3. The system according to claim 2, wherein the one or more user defined eye surgery protocols are uploaded from a remote location.

4. The system according to claim 1, wherein the processor is further configured to indicate to the user an incompatibility between parameters of a user defined eye surgery protocol.

5. The system according to claim 1, wherein the processor is further configured to enable the user to modify a parameter of the one or more user defined eye surgery protocols using the GUI, to test the compatibility of the modified parameter with the eye surgery system, and to provide an indication of the compatibility to the user.

6. The system according to claim 1, wherein the processor is configured to provide the indication of the compatibility by highlighting one or more fields of the GUI.

7. The system according to claim 1, wherein the eye surgery system comprises a phacoemulsification system and the protocols comprise one or more phacoemulsification protocols.

8. The system according to claim 7, wherein the phacoemulsification system comprises:
a phacoemulsification handpiece comprising one or more piezoelectric crystals configured to vibrate a needle coupled with the one or more piezoelectric crystals; and
one or more drive-modules configured to vibrate the one or more piezoelectric crystals in a plurality of trajectories, in response to respective inputs to the drive-modules, wherein the processor is configured to:
select first parameters configured to vibrate the needle in a first trajectory;
select second parameters configured to vibrate the needle in a second trajectory;
determine that the inputs required for the drive-modules, in response to the first and second parameters, are incompatible with each other; and
provide an indication of the incompatibility to the user.

9. The system according to claim 7, wherein the one or more phacoemulsification protocols specify parameters comprising one or more of: aspiration rate, vacuum level, phacoemulsification power and driving waveform parameters.

10. The system according to claim 7, wherein the processor is configured to provide the indication of the incompatibility by highlighting one or more fields of the GUI.

11. An eye surgery method, comprising:
defining one or more eye surgery protocols on a graphical user interface (GUI) using an Input/Output (I/O) device, and, using the I/O device, display the one or more user defined eye surgery protocols on the GUI;
testing compatibility of the one or more user defined eye surgery protocols with the eye surgery system prior to operation of the eye surgery system in a surgical procedure; and
providing an indication on the GUI of the compatibility to a user of the eye surgery system prior to operation of the eye surgery system in the surgical procedure.

12. The method according to claim 11, wherein presenting the one or more user defined protocols comprises uploading the one or more user defined eye surgery protocols to the GUI.

13. The method according to claim 12, wherein the one or more user defined eye surgery protocols are uploaded from a remote location.

14. The method according to claim 11, further comprising indicating to the user an incompatibility between parameters of a user defined eye surgery protocol.

15. The method according to claim 11, further comprising enabling the user to modify a parameter of the one or more user defined eye surgery protocols using the GUI, to test the compatibility of the modified parameter with the eye surgery system, and to provide an indication of the compatibility to the user.

16. The method according to claim 11, wherein providing the indication of the compatibility comprises highlighting one or more fields of the GUI.

17. The method according to claim 11, wherein the eye surgery system comprises a phacoemulsification system and the protocols comprise one or more phacoemulsification protocols.

18. The method according to claim 17, wherein the phacoemulsification system comprises:
a phacoemulsification handpiece comprising one or more piezoelectric crystals configured to vibrate a needle coupled with the one or more piezoelectric crystals; and
one or more drive-modules configured to vibrate the one or more piezoelectric crystals in a plurality of trajectories, in response to respective inputs to the drive-modules, wherein the processor is configured to:
select first parameters configured to vibrate the needle in a first trajectory;
select second parameters configured to vibrate the needle in a second trajectory;
determine that the inputs required for the drive-modules, in response to the first and second parameters, are incompatible with each other; and
provide an indication of the incompatibility to the user.

19. The method according to claim 17, wherein the one or more phacoemulsification protocols specify parameters comprising one or more of: aspiration rate, vacuum level, phacoemulsification power and driving waveform parameters.

20. The method according to claim 17, wherein providing the indication of the incompatibility comprises highlighting one or more fields of the GUI.

21. A computer software product, the product comprising a tangible non-transitory computer-readable medium in which program instructions are stored, which instructions, when read by a processor, cause the processor to:
enable a user to define one or more eye surgery protocols using a graphical user interface (GUI) of an Input/Output (I/O) device, and, using the I/O device, to present one or more user defined eye surgery protocols on a display of the GUI;
test compatibility of the one or more user defined eye surgery protocols with the eye surgery system prior to operation of the eye surgery system in a surgical procedure; and
provide an indication of the compatibility to a user of the eye surgery system on the GUI prior to operation of the eye surgery system in the surgical procedure.

* * * * *